(12) United States Patent
Weitzel et al.

(10) Patent No.: US 6,809,174 B2
(45) Date of Patent: Oct. 26, 2004

(54) PROCESS FOR RECLAIMING RESIDUAL ETHYLENE IN THE PREPARATION OF VINYL ETHYLENE COPOLYMERS

(75) Inventors: Hans-Peter Weitzel, Reischach (DE); Robert Braunsperger, Burghausen (DE)

(73) Assignee: Wacker Polymer Systems, GmbH & Co. KG, Burghausen (DE)

( * ) Notice: Subject to any disclaimer, the term of this patent is extended or adjusted under 35 U.S.C. 154(b) by 0 days.

(21) Appl. No.: 10/678,365

(22) Filed: Oct. 3, 2003

(65) Prior Publication Data

US 2004/0097701 A1 May 20, 2004

(30) Foreign Application Priority Data

Nov. 14, 2002 (DE) .......................................... 102 53 043

(51) Int. Cl.$^7$ ................................................. C08F 6/24
(52) U.S. Cl. ........................... 528/501; 526/68; 526/331
(58) Field of Search ............................ 528/501; 526/68, 526/331

(56) References Cited

U.S. PATENT DOCUMENTS

| | | | | |
|---|---|---|---|---|
| 4,657,994 A | * | 4/1987 | Tanaka et al. | ................ 526/68 |
| 5,207,929 A | * | 5/1993 | Sung et al. | ................ 210/774 |

FOREIGN PATENT DOCUMENTS

| | | |
|---|---|---|
| DE | 197 09 254 | 9/1998 |
| EP | 0 127 253 A1 | 12/1984 |
| EP | 0 722 953 | 7/1996 |
| WO | WO 01/00559 A1 | 1/2001 |

OTHER PUBLICATIONS

Fox T.G., Bull. Am. Physics Soc. 1, 3, p. 123 (1956).
Polymer Handbook, 2nd Edition, J. Wiley & Sons, New York [1975] pp. III–139 to III–191.
Derwent Abstract, CPI, 1976, Ref. 17039X/10 corres. to DD 117079A.
Hochmolekularbericht 1985, Ref. H 14967/85 corres. to EP 136559A.
Hochmolekularbericht 1979, Ref. H 11054/79 corres. to JP 53–119801A.
WILA, excerpts from OS, part 1, 1970 corres. to DE 1962254A.
Derwent Abstract, CPI, 1976, Ref. 44051X/24 corres. to BE 835951A.
Derwent Abstract, CPI, 1984, Ref. 84–302863/49 corres. to JP 59–187009A.
Derwent Abstract, CPI, 1968, Ref. 68–13827Q/4.11 corres. to JP 68–22848B.
Derwent Abstract, CPI, 1978, Ref. 51605A/28 corres. to US 4,091,200 A.

(List continued on next page.)

*Primary Examiner*—Fred Teskin
(74) *Attorney, Agent, or Firm*—Brooks Kushman P.C.

(57) ABSTRACT

A process for preparing copolymers via free-radical-initiated polymerization of one or more vinyl esters, ethylene, and also, where appropriate, other ethylenically unsaturated monomers copolymerizable therewith, at a pressure of from 5 to 100 bar abs., in an aqueous medium, by emulsion or suspension polymerization, which comprises, after termination of the polymerization, reclaiming residual unreacted ethylene by depressurizing the polymerization reaction mixture to a pressure of from 0.1 to 5 bar absolute, comprising a gas phase containing residual ethylene gas to a pressure of from 2 to 20 bar absolute, absorbing the gas phase into vinyl ester(s), and reusing the resulting solution of ethylene in vinyl esters(s) in a further polymerization.

12 Claims, 1 Drawing Sheet

OTHER PUBLICATIONS

Derwent Abstract, CPI, 1974, ref. 44799V/24 corres. to JP 74–020294 A.
Derwent Abstract, CPI, 1975, Ref. 54997 W/33 corres. to JP 75–021480A.
English Derwent Abstract corres. to JP 53–119801A [AN 1978–84816A].
English Derwent Abstract corres. to EP 136559A [AN 1985–088435].
Derwent Abstract corres. to DE 1962254 [AN 1970–41552R].
Derwent Abstract corresponding to JP 53 119801 [AN 1978–84816A].
Deerwent Abstract corresponding to DE 197 09 254 [AN 1998–482063].

* cited by examiner

PROCESS FOR RECLAIMING RESIDUAL ETHYLENE IN THE PREPARATION OF VINYL ETHYLENE COPOLYMERS

BACKGROUND OF THE INVENTION

1. Field of the Invention

The invention relates to a process for preparing copolymers in which vinyl esters and ethylene are present, while reclaiming the residual unreacted ethylene, via free-radical-initiated polymerization of one or more vinyl esters, ethylene, and also, where appropriate, other ethylenically unsaturated monomers copolymerizable therewith, at a pressure of from 5 to 100 bar abs. by emulsion or suspension polymerization, in an aqueous medium

2. Background Art

Polymers based on vinyl ester and ethylene, and also, where appropriate, vinyl chloride and (meth)acrylate monomers, are used especially in the form of their aqueous dispersions or of their water-redispersible polymer powders in a wide variety of applications, for example as coating compositions or adhesives for a correspondingly wide variety of substrates. Protective colloids or low-molecular-weight surface-active compounds are used to stabilize these polymers. The protective colloids generally used comprise polyvinyl alcohols.

High conversion levels are the state of the art in large-scale industrial polymerization processes. For example, polymerization of the polymers is usually complete to the extent that the residual monomer content is <0.1% by weight, preferably <0.05% by weight, and in the case of vinyl chloride <0.01% by weight. However, these high conversions are based only on the monomers which are liquid under polymerization conditions. Ethylene is a monomer which is gaseous under polymerization conditions, and does not follow these guidelines. Firstly, it polymerizes more slowly than other monomers such as vinyl acetate, and secondly it is largely present in the gas phase and is inaccessible under the usual conditions of emulsion polymerization. Specifically, the polymerization process proceeds only in the liquid phase, with involvement of ethylene which has dissolved in water, in monomer, or in a particle.

For reasons of cost-effectiveness, the intention is that large-scale industrial polymerization processes should reach completion in the shortest possible times, but this inevitably means that it is impossible to consume all of the ethylene used. The polymerization process is usually interrupted, and the reaction mixture depressurized, when the residual ethylene gas content is less than 5% by weight, preferably less than 2% by weight. The depressurization procedure encompasses the transfer of the reaction mixture (polymer dispersion+residual gas) from a pressure reactor into an unpressurized reactor, with removal of residual ethylene. Further monomer removal from the resultant latex then takes place in a known manner. However, the excess of ethylene is discarded, generally via combustion.

This prior-art procedure has the disadvantage of low cost-effectiveness, due to poor monomer utilization and high disposal costs. Reuse of the resultant ethylene is inhibited by the fact that the residual gas would have to be recompressed in advance to a high pressure (>80 bar). This is an energy-intensive process which, on grounds of cost-effectiveness, inhibits recycling, because the residual gas also has to be purified in a complicated process prior to recompression, in order, for example, to avoid the occurrence of pressure surges during the compression process.

The prior art discloses various processes for reclaiming residual ethylene. WO-A 01/00559 describes processes for reclaiming ethylene from the ethylene-containing inert gas stream arising during vinyl acetate preparation. The ethylene-containing inert gas is absorbed in vinyl acetate, the ethylene is liberated via depressurization in a vacuum vessel, and is then recompressed for reuse. In another process described, the ethylene-containing inert gas stream is absorbed in acetic acid and is brought into contact with ethylene-containing residual gas in a stripping column, the ethylene reclaimed at the column head, and recycled into the vinyl acetate synthesis process. EP-A 127253 relates to the removal of residual monomer in the gas-phase polymerization of copolymers of ethylene and higher olefins. For this, the solid copolymer is freed from the higher olefins at reduced pressure and then treated with inert-gas-free reactor gas, which is finally returned to the polymerization process.

SUMMARY OF THE INVENTION

It was an object of the present invention to provide a process which permits cost-effective reuse of the residual gas. This and other objects are achieved by depressurizing an ethylene-containing reaction mixture, compressing a gas phase obtained thereby to a modestly increased pressure, absorbing the ethylene-containing compressed gas into one or more vinyl ester monomers, and employing the ethylene-containing vinyl ester(s) in the same or a further polymerization process.

DETAILED DESCRIPTION OF THE PREFERRED EMBODIMENT(S)

Figure 1:
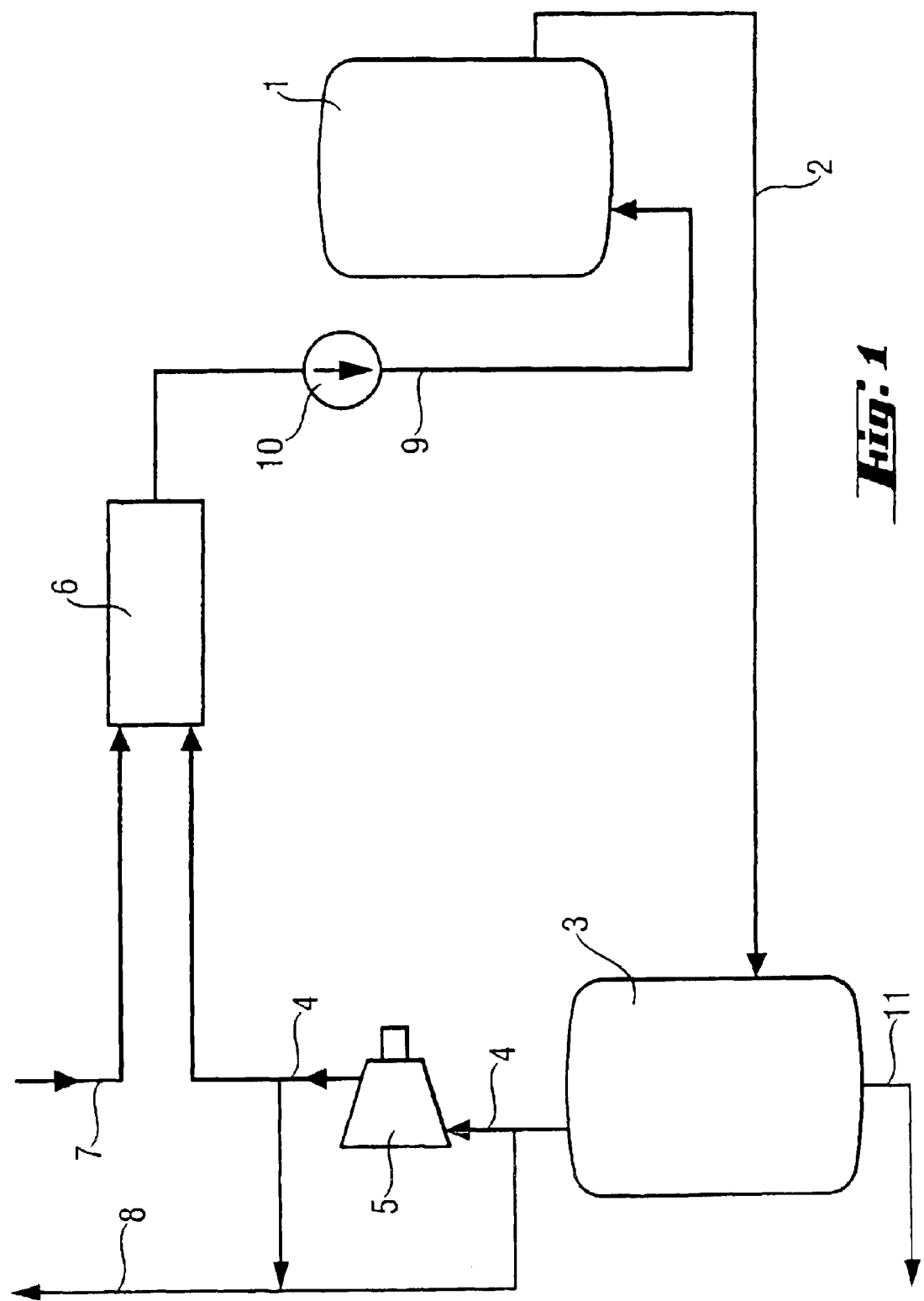
FIG. 1 illustrates schematically one embodiment of the subject invention process.

The invention provides a process for preparing copolymers in which vinyl esters and ethylene are present, while reclaiming the residual unreacted ethylene, via free-radical-initiated polymerization of one or more vinyl esters, ethylene, and also, where appropriate, other ethylenically unsaturated monomers copolymerizable therewith, at a pressure of from 5 to 100 bar abs., in an aqueous medium, by emulsion or suspension polymerization, which comprises, after termination of the polymerization, depressurizing the reaction mixture to a lower pressure of from 0.1 to 5 bar abs., compressing the gas phase with the residual ethylene-containing gas to a higher pressure of from 2 to 20 bar abs., absorbing the gas phase into vinyl esters, and reusing the resultant mixture in a polymerization process.

Suitable vinyl esters are those of carboxylic acids having from 1 to 18 carbon atoms. Preference is given to vinyl acetate, vinyl propionate, vinyl butyrate, vinyl-2-ethylhexanoate, vinyl laurate, 1-methylvinyl acetate, vinyl pivalate and vinyl esters of α-branched monocarboxylic acids having from 9 to 13 carbon atoms, examples being VeoVa® and VeoVa10®, available from Resolution Products. Vinyl acetate is particularly preferred.

Suitable monomers copolymerizable with vinyl ester(s) and ethylene are acrylic or methacrylic esters of unbranched or branched alcohols having from 1 to 18 carbon atoms. Preferred methacrylic or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particular preference is given to methyl acrylate, methyl methacrylate, n-butyl acrylate, tert-butyl acrylate, and 2-ethylhexyl acrylate. Vinyl halides, such as vinyl chloride, are also suitable.

From 0.1 to 50% by weight, based on the total weight of the monomer mixture, of auxiliary monomers may also be copolymerized. It is preferable to use from 0.5 to 15% by weight of auxiliary monomers. Examples of auxiliary monomers are ethylenically unsaturated mono- and dicarboxylic acids; ethylenically unsaturated carboxamides and ethylenically unsaturated carbonitriles; ethylenically unsaturated sulfonic acids, and salts of these. Other examples are precrosslinking comonomers, for example ethylenically polyunsaturated comonomers, or post-crosslinking comonomers, for example N-methylolacrylamide (NMA). Epoxy-functional comonomers are also suitable, an example being glycidyl methacrylate, as are silicon-functional comonomers.

It is preferable to use a mixture of vinyl acetate and ethylene; or else a mixture of vinyl acetate and other vinyl esters such as vinyl laurate, or vinyl esters of α-branched monocarboxylic acids having from 9 to 13 carbon atoms, and ethylene; or else a mixture of vinyl chloride, ethylene, and vinyl ester(s) such as vinyl laurate.

The manner of selection of the monomers and the parts by weight of the comonomers is generally such as to give a glass transition temperature Tg of from −50 to +50° C., preferably from −20 to +20° C. The glass transition temperature Tg of the polymers may be determined in a known manner by differential scanning calorimetry (DSC). Tg may also be approximated by the Fox equation. According to T. G. Fox, BULL. AM. PHYSICS SOC. 1, 3, page 123 (1956), $1/Tg = x_1/Tg_1 + x_2/Tg_2 + \ldots + x_n/Tg_n$, where $x_n$ is the fraction of the monomer n by weight (% by weight/100), and $Tg_n$ is the glass transition temperature in Kelvin of the homopolymer of the monomer n. Tg values for homopolymers are listed in POLYMER HANDBOOK 2nd Edition, J. Wiley & Sons, New York (1975).

The preparation of the polymers by emulsion polymerization or suspension polymerization, in the presence of protective colloids and/or of emulsifiers, is known per se. The polymerization temperature is generally from 40 to 100° C., preferably from 60 to 90° C. The pressure generally used for copolymerization with ethylene is from 5 to 100 bar abs.

The polymerization process is initiated by water-soluble initiators, monomer-soluble initiators, or redox-initiator combinations commonly used for emulsion polymerization and suspension polymerization. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, t-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators generally used is from 0.01 to 0.5% by weight, based on the total weight of the monomers. Redox initiators used are combinations of the initiators previously mentioned with reducing agents. Suitable reducing agents are the sulfites and bisulfites of the alkali metals and of ammonium, an example being sodium sulfite, the derivatives of sulfoxylic acid, for example zinc formaldehyde sulfoxylate or alkali metal formaldehyde sulfoxylates, for example sodium hydroxymethanesulfinate, and ascorbic acid. The amount of reducing agent is preferably from 0.01 to 0.5% by weight, based on the total weight of the monomers.

To control the molecular weight, regulating substances ("chain transfer agents") may be used during the polymerization process. If regulators are used, the amounts generally employed are from 0.01 to 5.0% by weight, based on the monomers to be polymerized, the regulators being added separately and/or premixed with components for the reaction. Examples of these substances are n-dodecyl mercaptan, tert-dodecyl mercaptan, mercaptopropionic acid, methyl mercaptopropionate, isopropanol, and acetaldehyde. It is preferable to use no regulating substances.

Suitable protective colloids are partially hydrolyzed polyvinyl alcohols; polyvinylpyrrolidones; polyvinyl acetals; polysaccharides in water-soluble form, e.g. starches such as amylose and amylopectin, celluloses and their carboxymethyl, methyl, and hydroxyethyl, hydroxypropyl derivatives; proteins such as casein or caseinate, soya protein, and gelatins; ligninsulfonates; synthetic polymers such as poly(meth)acrylic acid, copolymers of (meth) acrylates with carboxy-functional comonomer units, poly (meth)acrylamide, polyvinylsulfonic acids and their water-soluble copolymers; melamine-formaldehydesulfonates, naphthalene-formaldehydesulfonates, styrene-maleic acid copolymers, and vinyl ether-maleic acid copolymers. Preference is given to partially hydrolyzed or fully hydrolyzed polyvinyl alcohols.

The total amount of the protective colloids generally added during the polymerization process is from 1 to 20% by weight, based on the total weight of the monomers. All of the protective colloid content may form an initial charge, or else a portion may form an initial charge and a portion may form a feed.

Emulsifiers suitable for the emulsion polymerization process are anionic, cationic, and non-ionic emulsifiers, for example anionic surfactants such as alkyl sulfates whose chain length is from 8 to 18 carbon atoms, alkyl or alkylaryl ether sulfates having from 8 to 18 carbon atoms in the hydrophobic radical and up to 40 ethylene or propylene oxide units, alkyl- or alkylarylsulfonates having from 8 to 18 carbon atoms, esters and half esters of sulfosuccinic acid with monohydric alcohols or with alkylphenols, and non-ionic surfactants, such as alkylpolyglycol ethers or alkylarylpolyglycol ethers having from 8 to 40 ethylene oxide units. The amount of the emulsifiers generally used is 0.1 to 5% by weight, based on the amount of monomer.

The polymerization is generally terminated at a conversion of greater than or equal to 95%, and is preferably taken to a conversion of from 95 to 99% by weight of the monomers which are liquid under polymerization conditions. The polymerization mixture is then depressurized to a lower pressure of from 0.1 to 5 bar abs., preferably from 0.1 to 1 bar abs. For this, the reaction mixture is generally transferred into a reactor in which the appropriate pressure prevails.

After depressurization, the polymer dispersion is discharged, and the gas phase is compressed to a higher pressure of from 2 to 20 bar abs., preferably from 5 to 10 bar abs. Examples of suitable compressors are liquid ring compressors, reciprocating compressors, rotary-vane compressors, and screw compressors. After the compression process, the residual gas is mixed with vinyl ester monomer, which is compressed to an appropriate pressure. The mixing ratio is generally from 0.1 to 10% by weight of ethylene, based on the amount of vinyl esters. Examples of suitable mixing equipment are static mixers, stirrers, mixing tubes, or absorbers.

The mixture is then reused in a polymerization process for the appropriate vinyl ester-ethylene copolymers. The process of the invention is particularly suitable for continuous operation, but can also be used similarly for batch processes.

The principle of the process preferably encompasses dissolving the residual ethylene at relatively low pressure in the monomer used, and returning the mixture to the reaction mixture. The result in an ideal case is complete elimination of residual gas. When this procedure is used, there is no need for recompression to a high pressure level, or for purification of the residual gas.

The following inventive example (see FIG. 1) serves for further illustration of the process of the invention.

EXAMPLE 1

1170 g of water, 728 g of polyvinyl alcohol, and 1930 g of vinyl acetate form an initial charge in a pressure reactor 1 with feed pumps, stirrer, jacket cooling, and connections (2, 9) for filling and emptying the reactor. This pre-emulsion is adjusted to pH 4.0 and heated to 55° C. An ethylene pressure of 18 bar is then applied to the autoclave. To initiate the polymerization, aqueous solutions of tert-butyl hydroperoxide (TBHP, 1.5% strength) and Brüggolit (2.5% strength) are metered in, each at 30 g/h. The temperature is held at 55° C. by cooling. 60 minutes after the start of the reaction, the feed of 484 g of vinyl acetate over 90 minutes and 168 g of polyvinyl alcohol and 120 g of water over 120 minutes is begun. Following the start of the reaction, further ethylene is fed at 38 bar until the total amount is 260 g. Polymerization was then "completed" over a period of one further hour.

Residual ethylene content at this juncture is from about 1 to 1.5% by weight, based on the amount of dispersion. The reaction mixture is then depressurized via line 2 into reactor 3 in which a vacuum (pressure: 0.3 bar abs.) prevails.

The usual procedure here would be to discard the residual gas directly via lines 4 and 8, i.e. to pass the gas to combustion.

In the present example, the residual gas is instead compressed by way of compressor 5 to 9 bar, and, by the way of mixing unit 6, dissolved in vinyl acetate which has been fed from supply 7 with a pressure of 8 bar abs., the ratio by weight being 3% by weight of ethylene, based on vinyl acetate. The resultant mixture is returned to the reactor 1 by means of pump 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for reclaiming residual unreacted ethylene when preparing copolymers via free-radical-initiated polymerization of one or more vinyl esters, ethylene, and optionally other ethylenically unsaturated monomers copolymerizable therewith, at a pressure of from 5 to 100 bar absolute in an aqueous medium by emulsion or suspension polymerization, comprising depressurizing the reaction mixture to a lower pressure of from 0.1 to 5 bar absolute, compressing the gas phase with the residual ethylene-containing gas to a higher pressure of from 2 to 20 bar absolute, and absorbing the gas phase into one or more vinyl esters, and reusing the resultant mixture in further polymerization.

2. The process of claim 1, wherein ethylene is absorbed into vinyl esters in a mixing ratio of from 0.1 to 10% by weight of ethylene, based on the weight of vinyl esters.

3. The process of claim 1, which is a continuous process or a batch process.

4. The process of claim 2, which is a continuous process or a batch process.

5. The process of claim 1, wherein the polymerization process is terminated at a conversion of from 95 to 99% by weight of the monomers which are liquid under polymerization conditions, prior to said step of depressurizing.

6. The process of claim 2, wherein the polymerization process is terminated at a conversion of from 95 to 99% by weight of the monomers which are liquid under polymerization conditions, prior to said step of depressurizing.

7. The process of claim 3, wherein the polymerization process is terminated at a conversion of from 95 to 99% by weight of the monomers which are liquid under polymerization conditions, prior to said step of depressurizing.

8. The process of claim 4, wherein the polymerization process is terminated at a conversion of from 95 to 99% by weight of the monomers which are liquid under polymerization conditions, prior to said step of depressurizing.

9. The process of claim 1, wherein the monomers polymerized are selected from the group consisting of a mixture of vinyl acetate and ethylene, a mixture of vinyl acetate and at least one different vinyl ester and ethylene, and a mixture of vinyl chloride, ethylene and one or more vinyl ester(s).

10. The process of claim 1, wherein said lower pressure is from 0.1 to 1 bar absolute.

11. The process of claim 1, wherein said higher pressure is from 5 to 10 bar absolute.

12. The process of claim 10, wherein said higher pressure is from 5 to 10 bar absolute.

* * * * *